(12) United States Patent
Nakagawa et al.

(10) Patent No.: US 7,498,283 B2
(45) Date of Patent: Mar. 3, 2009

(54) GLASS POWDER AND RESIN COMPOSITION COMPRISING IT

(75) Inventors: Hideki Nakagawa, Yokohama (JP); Hideki Endou, Tokyo (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 618 days.

(21) Appl. No.: 11/187,970

(22) Filed: Jul. 25, 2005

(65) Prior Publication Data
US 2006/0025513 A1 Feb. 2, 2006

(30) Foreign Application Priority Data
Jul. 27, 2004 (JP) ............... 2004-218951
Jun. 6, 2005 (JP) ............... 2005-165769

(51) Int. Cl.
*C03C 3/17* (2006.01)
*C03C 3/19* (2006.01)
*C08K 3/32* (2006.01)

(52) U.S. Cl. ............... 501/47; 501/33; 501/48; 524/405; 524/414; 524/415; 524/418

(58) Field of Classification Search ............... 501/33, 501/45, 47, 48; 524/414, 427, 494, 415, 524/405, 418
See application file for complete search history.

(56) References Cited

U.S. PATENT DOCUMENTS

| | | | |
|---|---|---|---|
| 4,544,695 A * | 10/1985 | Myers | 524/405 |
| 6,001,755 A * | 12/1999 | Araujo et al. | 501/77 |
| 6,103,810 A | 8/2000 | Frayer et al. | |
| 6,360,562 B1 * | 3/2002 | Kodas et al. | 65/21.1 |
| 6,407,148 B1 * | 6/2002 | Krejci et al. | 523/116 |
| 6,762,219 B2 * | 7/2004 | Greiner et al. | 523/223 |
| 6,995,204 B2 * | 2/2006 | Endou et al. | 524/417 |
| 7,205,346 B2 * | 4/2007 | Harashina | 524/133 |
| 7,230,046 B2 * | 6/2007 | Mhetar et al. | 524/415 |
| 2004/0167294 A1 * | 8/2004 | Endou et al. | 525/342 |
| 2005/0027048 A1 * | 2/2005 | Nakagawa et al. | 524/115 |
| 2006/0166806 A1 * | 7/2006 | Fechner et al. | 501/45 |

FOREIGN PATENT DOCUMENTS

| | | |
|---|---|---|
| EP | 0 643 097 A1 | 3/1995 |
| GB | 2051085 * | 1/1981 |
| JP | 9-3335 | 1/1997 |
| JP | 10-101364 | 4/1998 |
| JP | 2001-64036 | 3/2001 |
| JP | 2001-64524 | 3/2001 |
| JP | 2001-335684 | 12/2001 |
| JP | 2003048808 * | 2/2003 |

OTHER PUBLICATIONS

Derwent Publications, AN 1998-291893, XP-002349350, JP 10-101364, Apr. 21, 1998.

* cited by examiner

*Primary Examiner*—Karl E Group
(74) *Attorney, Agent, or Firm*—Oblon, Spivak, McClelland, Maier & Neustadt, P.C

(57) ABSTRACT

A glass powder having an average particle size of at least 0.5 μm and smaller than 5.0 μm, having a specific surface area of at least 1.5 m²/cm³, and having a glass transition temperature higher than 200° C. and lower than 400° C.

32 Claims, No Drawings

GLASS POWDER AND RESIN COMPOSITION COMPRISING IT

The present invention relates to a glass powder. Particularly, it relates to a glass powder capable of imparting excellent flame retardancy to a resin composition and improving mechanical properties of the resin composition, and a resin composition comprising it.

A glass powder is widely used mainly as filler agent for a resin since it has effects to improve dimensional stability, moldability, etc. Further, a low melting glass having a specific glass composition has a function to shut out oxygen by forming a vitreous coating on the surface of a molded product at the time of heating and is expected as a flame retardant.

U.S. Pat. No. 4,544,695 discloses that a low melting glass comprising a sulfate is effective for imparting flame retardancy, but such a glass has a problem in water resistance and is not practically used. On the other hand, JP-A-09-003335 and JP-A-10-101364 disclose a phosphate type glass containing a sulfate having favorable water resistance has a high effect of suppressing smoke generation at the time of burning a vinyl chloride resin. However, such a phosphate type glass comprises particles which pass through a 100 mesh and include particles at a level of 100 μm, and accordingly mechanical strength of a resin composition may be insufficient in some cases.

Further, JP-A-2001-64036 and JP-A-2001-64524 disclose a phosphate type glass imparting a high flame retardancy to a thermoplastic resin while maintaining practical water resistance. It is disclosed that such a phosphate type glass preferably has an average particle size of at most 0.5 mm, particularly preferably comprises particles which pass through a 100 mesh. However, the glass comprises particles which pass through a 100 mesh contains particles at a level of 100 μm, and mechanical strength of a resin composition is thereby insufficient in some cases.

Further, European Patent No. 0643097 discloses a polyether sulfone resin composition having a high content of a low melting glass and having a high moisture resistance. It discloses a low melting glass having an average particle size of about 10 μm. Although such a resin composition is excellent in moisture resistance, a non-dispersed low melting glass may be present in a molded product of the resin composition. JP-A-2001-335684 discloses a polycarbonate resin composition containing a low melting glass and having a high flame retardancy imparted thereto. A low melting glass with particle sizes of at most 100 mesh is used in Examples, and the composition is excellent in flame retardancy but is insufficient in mechanical strength in some cases.

Under these circumstances, it is an object of the present invention to overcome the above problems regarding a resin and to provide a glass powder capable of imparting excellent flame retardancy to a resin or suppressing smoke generation of a resin and further improving physical properties of a resin composition, and a resin composition comprising it.

The present inventors have conducted extensive studies to achieve the above object and as a result, the present invention has been accomplished. Namely, the present invention provides a glass powder having an average particle size of at least 0.5 μm and smaller than 5.0 μm, having a specific surface area of at least 1.5 m$^2$/cm$^3$, and having a glass transition temperature higher than 200° C. and lower than 400° C.

The present invention further provides the above glass powder, which has a particle size distribution represented by the following formula of at most 2.5:

Particle size distribution=$(D90-D10)/D50$ wherein D10, D50 and D90 represent, in a cumulative particle size curve prepared by measuring the particle size by using a laser scattering type particle size measuring apparatus, particle sizes when accumulated amounts are 10%, 50% and 90%, respectively.

The present invention further provides the above glass powder, which substantially has the following composition as represented by mol % based on oxides, and has a glass transition temperature higher than 300° C. and lower than 400° C. Hereinafter this glass composition will be referred to as a first glass composition. $P_2O_5$: 22 to 27%, $SO_3$: 3 to 18%, ZnO: 10 to 55%, $Al_2O_3$: 1 to 5%, $B_2O_3$: 5 to 15%, $Li_2O+Na_2O+K_2O$: 5 to 35% (provided that $Li_2O$: 0 to 15%, $Na_2O$: 3 to 15%, $K_2O$: 0 to 10%), MgO: 0 to 15%, CaO: 0 to 15%, BaO: 0 to 15% and SnO: 0 to 15%.

The present invention further provides the above glass powder, which substantially has the following composition as represented by mol % based on oxides, and has a glass transition temperature higher than 200° C. and lower than 300° C. Hereinafter this glass composition will be referred to as a second glass composition. $P_2O_5$: 22 to 27%, $SO_3$: 8 to 18%, ZnO: 25 to 40%, $Al_2O_3$: 0 to 2%, $B_2O_3$: 0 to 10%, $Li_2O+Na_2O+K_2O$: 25 to 35% (provided that $Li_2O$: 5 to 15%, $Na_2O$: 8 to 20%, $K_2O$: 5 to 10%), MgO: 0 to 15%, CaO: 0 to 15%, BaO: 0 to 15% and SnO: 0 to 15%.

The present invention further provides the above glass powder, which is subjected to a surface treatment with a treating agent containing at least a coupling agent.

The present invention further provides the above glass powder, wherein the coupling agent is a silane coupling agent.

The present invention further provides the above glass powder, wherein the treating agent is a treating agent containing a urethane resin or an epoxy resin.

The present invention further provides a resin composition comprising 100 parts by mass of a resin and from 0.5 to 100 parts by mass of the above glass powder.

The glass powder of the present invention is capable of imparting excellent flame retardancy to a resin or suppressing smoke generation of a resin and further improving physical properties of a resin composition.

Now, the present invention will be described in detail with reference to the preferred embodiments.

The glass powder of the present invention is characterized by having an average particle size (volume basis, D50) of at least 0.5 μm and smaller than 5.0 μm, having a specific surface area of at least 1.5 m$^2$/cm$^3$ and having a glass transition temperature higher than 200° C. and lower than 400° C.

The average particle size, the particle size distribution and the specific surface area of the glass powder are obtained as follows. The particle size was measured by using a laser scattering type particle size measuring apparatus (LA-700, manufactured by HORIBA, Ltd.), and in the obtained cumulative curve of the particle size corresponding to spheres on the volume basis, the particle sizes when accumulated amounts are 10%, 50% and 90% are taken as D10, D50 and D90, respectively. The value of D50 (volume basis, D50) was employed as the average particle size, the particle size distribution was obtained from the following formula, and as the specific surface area, the sum of the surface area of the entire glass powder contained in unit volume (1 cm$^3$) was employed:

Particle size distribution=$(D90-D10)/D50$ (wherein D10, D50 and D90 represent, in a cumulative particle size curve prepared by measuring the particle size by using a laser scattering type particle size measuring apparatus, particles sizes of particles corresponding to spheres when accumulated amounts are 10%, 50% and 90%, respectively).

If the average particle size (volume basis, D50) of the above glass powder is less than 0.5 μm, although the effect of imparting flame retardancy to a resin or the effect of suppressing smoke generation of a resin will be obtained, the cost of the glass powder as an additive to the resin tends to be high, and its application range may be limited in some cases. It is preferably at least 0.7 μm, more preferably at least 1.0 μm. Further, if it is at least 5.0 μm, the mechanical strength of a resin composition may be insufficient in some cases. It is preferably smaller than 4.0 μm, more preferably smaller than 3.0 μm. Further, if the specific surface area is less than 1.5 m$^2$/cm$^3$, the area of the glass powder which will be in contact with the resin tends to be small, and it may be difficult to impart flame retardancy to a resin or suppressing smoke generation of a resin in some cases. The specific surface area is more preferably at least 1.8 m$^2$/cm$^3$. The specific surface area is represented by the sum of the surface area of the entire glass powder contained in unit volume (1 cm$^3$ in this case) by m$^2$.

Further, if the glass transition temperature of the glass powder is less than 200° C., the glass is likely to be melted due to heat when a resin component in the resin composition is burned, and although a flame retardancy effect can be obtained at a low temperature, at a high temperature region, the glass tends to have a low viscosity and is likely to flow, a glass coating is hardly formed, and as a result, the glass will be poor in the effect of imparting flame retardancy or suppressing smoke generation. Further, if the glass transition temperature is 400° C. or higher, the glass is hardly melted due to heat when a resin component in the resin composition is burned, whereby a glass coating is hardly formed, and as a result, the glass will be poor in the effect of imparting flame retardancy or suppressing smoke generation.

Further, the glass powder in the present invention preferably has a particle size distribution as represented by the above formula of at most 2.5. If the particle size distribution exceeds 2.5, the particle size distribution tends to be broad, and particularly particles with large particle sizes are included, whereby a glass powder having large particle sizes may be non-uniformly present in the resin composition, and as a result, the effect of imparting flame retardancy to a resin or suppressing smoke generation of a resin may be insufficient in some cases.

(Glass Composition)

The glass composition of the glass powder of the present invention is not particularly limited so long as the glass powder has an effect of imparting flame retardancy to a resin composition or a molded product obtained from the resin composition or suppressing smoke generation at the time of burning the resin composition or the molded product, and stable mass production is possible. Particularly in order that the effect of imparting flame retardancy and suppressing smoke generation at the time of burning is easily obtained, the glass powder is preferably a glass powder having a composition containing ZnO and SO$_3$ based on oxides.

As the first glass composition of the preferred glass powder of the present invention, the glass powder is preferably a glass powder substantially having the following composition as represented by mol % based on oxides, and having a glass transition temperature higher than 300° C. and lower than 400° C.: P$_2$O$_5$: 22 to 27%, SO$_3$: 3 to 18%, ZnO: 10 to 55%, Al$_2$O$_3$: 1 to 5%, B$_2$O$_3$: 5 to 15%, Li$_2$O+Na$_2$O+K$_2$O: 5 to 35% (provided that Li$_2$O: 0 to 15%, Na$_2$O: 3 to 15%, K$_2$O: 0 to 10%), MgO: 0 to 15%, CaO: 0 to 15%, BaO: 0 to 15%, SnO: 0 to 15%.

By the above glass composition, the glass will have favorable weather resistance and water resistance, and the glass will be resistant to heat or pressure when a resin composition is obtained or a resin composition is molded.

Further, as the second glass composition of the preferred glass powder of the present invention, the glass powder is preferably a glass powder substantially having the following composition represented by mol % based on oxides and having a glass transition temperature higher than 200° C. and lower than 300° C.: P$_2$O$_5$: 22 to 27%, SO$_3$: 8 to 18%, ZnO: 25 to 40%, Al$_2$O$_3$: 0 to 2%, B$_2$O$_3$: 0 to 10%, Li$_2$O+Na$_2$O+K$_2$O: 25 to 35% (provided that Li$_2$O: 5 to 15%, Na$_2$O: 8 to 20%, K$_2$O: 5 to 10%), MgO: 0 to 15%, CaO: 0 to 15%, BaO: 0 to 15%, SnO: 0 to 15%.

By the above glass composition, the glass will have favorable weather resistance and water resistance, and the glass will be resistant to heat or pressure when a resin composition is obtained or a resin composition is molded.

Considering the type of the resin to which the glass powder of the present invention is applied, and its decomposition starting temperature and properties at the time of burning, the glass composition may be classified into one having a glass transition temperature higher than 300° C. and lower than 400° C., and one having a glass transition temperature higher than 200° C. and lower than 300° C., and a glass powder having a more preferred glass transition temperature suitable for the resin characteristics can be applied.

Among the components of the glass, SO$_3$ is a component to suppress smoke generation at the time of burning a resin composition particularly a composition of a thermoplastic resin containing chlorine or a molded product to be obtained therefrom and to lower the glass transition temperature. If the SO$_3$ content is too low, the effect of suppressing smoke generation will not sufficiently be obtained, and if the content, is too high, the water resistance of the glass will remarkably decrease. Further, ZnO is a component to suppress smoke generation at the time of burning a resin composition particularly a composition of a thermoplastic resin containing chlorine and a molded product to be obtained therefrom. If the ZnO content is too low, the effect of suppressing smoke generation or desired water resistance will not be obtained, and if its content is too high, devitrification properties of the glass will increase, whereby vitrification tends to be difficult.

Further, the glass powder may contain, as components of the glass composition, a metal oxide of e.g. Sr, Ti, Fe, Co, Ni, Cu, Zr or Mo in addition to the above components within a range not impairing the effects of the present invention. Further, a composition having a low glass transition temperature can be obtained without impairing the effects of the present invention even when the glass powder contains no metal oxide of an alkaline earth metal such as Mg or Ca as a component of the glass composition.

The glass powder of the present invention is preferably subjected to a surface treatment with a treating agent containing at least a coupling agent. The surface treatment improves, when a resin composition is obtained from the glass powder and a resin or the obtained resin composition is molded, adhesion between the glass powder and the resin. If the adhesion between the glass powder and the resin is insufficient, there may be a gap at the interface thereof, which will suppress formation of a glass coating when the powder is melted at the time of burning, whereby the effect of imparting flame retardancy will be insufficient resultingly, and it is thereby important to prevent such a drawback. Further, occurrence of static electricity can be suppressed, whereby handling efficiency when the glass powder is handled will be improved.

Further, improvement in the adhesion between the resin and the glass powder will improve mechanical properties of the resin composition.

As the coupling agent, a silane coupling agent, a titanate coupling agent or the like may be used. Particularly preferred is a silane coupling agent in view of favorable adhesion between the resin and the glass powder. The silane coupling agent may, for example, be an aminosilane coupling agent, an epoxysilane coupling agent or a methacryloxide silane coupling agent. Among such silane coupling agents, particularly preferred is an aminosilane coupling agent in view of particularly excellent adhesion between the resin and the glass powder.

Further, the treating agent preferably further contains a urethane resin or an epoxy resin. When the treating resin contains a urethane resin or an epoxy resin, the adhesion between the resin and the glass powder will be more excellent, and the flame retardancy will be improved or the smoke generation will be more suppressed, and mechanical properties of the resin composition will be improved.

Further, the treating agent may contain a film former, a lubricant, an antistatic agent, etc. in addition to the above coupling agent and the urethane resin or the epoxy resin within a range not to impair the performance of the glass powder or the resin composition. The film former may, for example, be a polymer such a vinyl acetate resin, an acrylic resin, a polyester resin, a polyether resin, a phenoxy resin, a polyamide resin or a polyolefin or a modified product thereof. The lubricant may, for example, be an aliphatic ester, aliphatic ether, aromatic ester or aromatic ether surfactant. The antistatic agent may be an inorganic salt such as lithium chloride or potassium iodide or a quaternary ammonium salt such as an ammonium chloride form or an ammonium ethosulfate form.

Further, the blend ratio of the above components to be contained in the treating agent may suitably be selected depending upon the type of the resin used. The amount of the treating agent to be added in the glass powder is preferably from 0.2 to 2.0 mass % as a solid content on the basis of the mass of the glass powder after addition. If the addition amount is less than 0.2 mass %, the handling efficiency when the glass is handled will not sufficiently improve, adhesion to the resin will not sufficiently improve, and it tends to be difficult to protect the glass powder. Further, if the addition amount is larger than 2.0 mass %, dispersion of the glass powder into the resin will deteriorate.

(Process For Producing Glass Powder)

Now, a process for producing the glass powder of the present invention will be explained below. The glass powder of the present invention may be obtained by mixing glass-forming materials to achieve a desired glass composition, melting them and solidifying them to prepare glass cullet, and grinding it to achieve a desired average particle size by means of known method and apparatus.

As a method of grinding the glass cullet, a wet grinding method by means of e.g. a medium stirring mill, a colloid mill or a wet ball mill, or a dry grinding method by means of e.g. a jet mill, a dry ball mill or a roll crusher may be mentioned, and a plurality of grinding methods may be combined. A glass powder having a desired average particle size can be obtained by means of the above grinding method. Further, a classification treatment may be carried out so that the glass powder obtained by grinding has an average particle size of at least 0.5 μm and smaller than 5.0 μm. The classification treatment is not particularly limited, but it is preferred to use an air classifier or a sieving apparatus.

(Resin)

A resin to be used for the resin composition of the present invention is a thermoplastic resin or a thermosetting resin which is required to have flame retardancy or have its smoke generation suppressed, when formed into a resin composition.

The thermoplastic resin to be used for the resin composition of the present invention is not particularly limited. However, it may, for example, be a polyolefin represented by a polyethylene or a polypropylene, a polyamide, a polyethylene terephthalate, a polybutylene terephthalate, a polystyrene, a syndiotactic polystyrene, a styrene-acrylonitrile copolymer, an acrylonitrile-butadiene-styrene copolymer, a polymethyl methacrylate, a polyvinyl acetate, a polyethylene oxide, a polyvinyl alcohol, a polyimide, a polyetherimide, a polycarbonate, a polyphenylene sulfide, a thermoplastic polyurethane resin, a fluororesin, a polyvinyl chloride, a chlorinated polyvinyl chloride, a chlorinated polyethylene, a polyepichlorohydrin or a polyvinylidene chloride.

Particularly, the glass powder of the present invention can impart a function to suppress smoke generation at the time of burning to a thermoplastic resin containing chlorine. The thermoplastic resin containing chlorine is preferably at least one thermoplastic resin containing chlorine selected from the group consisting of a polyvinyl chloride, a chlorinated polyvinyl chloride, a chlorinated polyethylene, a polyepichlorohydrin and a polyvinylidene chloride.

Further, the glass powder of the present invention provides a remarkable flame retardancy effect to a thermoplastic resin which is highly required to have flame retardancy to be used for electronic components, particularly a heat resistant engineering plastic. The engineering plastic is preferably at least one engineering plastic selected from the group consisting of a polycarbonate resin, a polystyrene resin, an acrylonitrile-butadiene-styrene copolymer resin, an aromatic polyester resin, a polyamide resin, a polyalylate resin, a polyphenylene sulfide resin, a polyphenylene ether resin, a polysulfone resin, a polyethersulfone resin, a polyether ether ketone resin and a polyetherimide resin.

The thermoplastic resin to be used for the resin composition of the present invention may be a mixture of the above thermoplastic resins, for example, a mixture of a polycarbonate resin with a polystyrene resin or a polymer alloy of a polyphenylene ether resin with a polypropylene resin. Further, such a thermoplastic resin may have other monomer units in an amount smaller than that of main monomer units in the polymer structure. For example, a polystyrene resin may be a polystyrene resin having butadiene units.

The shape of the resin to be used for the resin composition of the present invention is not particularly limited, and the resin may be in a shape of pellets, particles, a powder, fibers or a liquid. Further, among the above resins, the thermoplastic resin may contain a thermoplastic resin composition obtained by recycling a molded product obtained by molding a thermoplastic resin composition.

(Composition)

The resin composition of the present invention comprises 100 parts by mass of the resin and from 0.5 to 100 parts by mass of the glass powder. The blend ratio of the glass powder is preferably from 1 to 70 parts by mass. Particularly in the case of a thermoplastic resin having relatively low burning properties such as a polycarbonate resin, sufficient flame retardancy will be achieved when the glass power is blended in an amount of from 0.5 to 50 parts by mass, and the blend ratio is more preferably from 1 to 30 parts by mass. Further, in the case of a vinyl chloride resin, sufficient effect of suppressing smoke generation and improvement in mechanical properties will be achieved when the glass powder is blended in an amount of from 1 to 100 parts by mass, and the blend ratio is more preferably from 5 to 70 parts by mass.

Further, in a case where the thermoplastic resin to be used for the resin composition of the present invention is a thermoplastic resin which is molded at a relatively low molding temperature (such as a polyphenylene ether resin), it is more preferred to use the preferred glass powder having a second glass composition of the present invention.

The resin composition of the present invention preferably further contains an anti-dripping agent in addition to the glass powder. The anti-dripping agent is blended for the purpose of inhibiting the thermoplastic resin which is softened and melted at the time of burning from flowing and dropping. As the anti-dripping agent, a fluororesin is mainly used. The fluororesin may, for example, be a polymonofluoroethylene, a polychlorotrifluoroethylene, a polytetrafluoroethylene (hereinafter referred to as PTFE), a polyvinylidene fluoride, a tetrafluoroethylene/hexafluoropropylene copolymer, a tetrafluoroethylene/perfluoro (alkyl vinyl ether) copolymer or an ethylene/tetrafluoroethylene copolymer. PTFE is preferred with a view to obtaining excellent anti-dripping effect with addition in a small amount. The amount of the anti-dripping agent blended is preferably from 0.05 to 2 parts by mass per 100 parts by mass of the resin. If it is less than 0.05 part by mass, no anti-dripping effect will be obtained, and if it exceeds 2 parts by mass, the mechanical strength of the resin composition may decrease or the flowability may decrease.

The resin composition of the present invention may further contain a flame retardant in addition to the glass powder for the purpose of further improving flame retardancy. The retardant may, for example, be a phosphorus flame retardant such as a phosphate flame retardant, a halogenated phosphate flame retardant, a polyphosphate flame retardant or a red phosphorus flame retardant, a metal hydroxide flame retardant such as magnesium hydroxide or aluminum hydroxide, a metal oxide flame retardant such as antimony trioxide, molybdenum oxide, tin oxide (SnO) or zinc oxide (ZnO), a bromine flame retardant such as decabromodiphenyl ether or tribromoallyl ether, or a chlorine flame retardant such as chlorinated paraffin. As such a flame retardant, a phosphorus flame retardant, a metal hydroxide flame retardant or a metal oxide flame retardant is preferred, and it is preferred that no bromine flame retardant or chlorine flame retardant is substantially used. Such an additive is preferably preliminarily incorporated into the resin component.

Particularly, as the phosphorus flame retardant, a phosphorus flame retardant containing no halogen atom such as a chlorine atom or a bromine atom is preferred. The phosphate flame retardant may, for example, be a monomer type phosphate flame retardant such as triphenyl phosphate (TPP), or a condensed phosphate flame retardant such as resorcinol bis (diphenyl phosphate) or bisphenol A-bis (diphenyl phosphate) (BADP). The polyphosphate flame retardant may, for example, be an ammonium polyphosphate (APP) or a melamine polyphosphate (MPP). The halogenated phosphate flame retardant may, for example, be tris(chloroethyl) phosphate. It is preferred to use at least one phosphorus flame retardant selected from the group consisting of a monomer type phosphate flame retardant and a condensed phosphate flame retardant, with a view to obtaining particularly excellent flame retardant effect. As the monomer type phosphate flame retardant, bis(nonylphenyl) phenyl phosphate, or tri (isopropylphenyl) phosphate or the like may be mentioned in addition to the above, and as the condensed phosphate flame retardant, bisphenol-A-bis(dicresyl phosphate) or the like may be mentioned in addition to the above. As a phosphorus flame retardant which is solid at room temperature, particularly preferred is resorcinol bis(dixylenyl) phosphate.

Further, the resin composition of the present invention may contain a coupling agent, a film former, a lubricant, an antistatic agent or the like separately from the above described components contained in the treating agent for the glass powder, and it may contain various additives such as a stabilizer and a slip additive in addition to the above components. As such an additive, a coupling agent such as a silane coupling agent, a plasicizer such as a phthalate ester, a slip additive such as a stearic acid derivative, an antioxidant such as a hindered phenol, a heat stabilizer such as an organotin compound, an ultraviolet absorber such as a benzotriazole compound, a colorant such as a pigment, an antistatic agent such as a surfactant, a filler agent such as calcium carbonate or a reinforcing material such as glass fibers may, for example, be suitably employed.

The resin composition of the present invention is produced by melting and mixing a resin and the glass powder, and other additives to be blended as the case requires. Particularly, a composition as a molding material is preferably produced by the same method as in a conventional method for producing a resin composition such as melting simultaneously with mixing (such as melt kneading) or melt kneading after mixing. Particularly, it is preferred that the above components are subjected to melt kneading and then extruded to form a molding material in the form of pellets or particles. The shape of the resin of the present invention as a molding material is not particularly limited, and it may be in a form of e.g. pellets, particles or a powder, and it is particularly preferably in the form of pellets or particles.

The resin composition of the present invention as a molding material may be molded in the same method as in the case of a conventional resin composition, whereby a molded product can be obtained. The molding method may, for example, be press molding, extrusion molding, calender molding, injection molding or pultrusion. By such a molding method, the resin composition of the present invention as a molded product can be obtained. Further, the resin composition of the present invention as a molded product can be obtained by melting and mixing a resin and the glass powder and other additives as the case requires in a molding machine such as an injection molding machine or an extruder and molding the molten mixture, without obtaining the resin composition of the present invention as a molding material.

The molded product may be used, for example, for electronic fields such as housing materials of electric machines, covering materials for electric wires, sealing materials for semiconductors and printed wiring boards, and for vehicle uses including interior materials, such as seat cushions, door panels, front panels and rear panels. Further, it may be used, for example, for materials for the roof, such as roofs, eaves and gutters, materials for exterior and outer walls such as siding materials, deck materials and fence materials, materials for opening such as window frames, doors and gates, materials for interior such as wall materials, floor materials, ceiling materials and heat insulating materials, and other building materials and building decoration materials, furniture materials, disaster preventing troughs and sign boards.

Now, the present invention will be explained in further detail with reference to specific Examples. However, it should be understood that the present invention is by no means restricted thereto.

Measuring methods and evaluation methods are shown below.

The average particle size, the particle size distribution and the specific surface area of a glass powder were measured by a laser scattering type particle size measuring apparatus (LA-700, manufactured by HORIBA, Ltd.). The particle sizes, in the obtained cumulative curve of the particle size corresponding to spheres on the volume basis, when accumulated amounts were 10%, 50% and 90% were taken as D10, D50 and D90, respectively. The value of D50 was employed for the average particle size, and the particle size distribution was obtained from the above formula. Further, as the specific surface area, the sum of the surface area of the entire glass powder contained in a unit volume (1 cm$^3$) was employed.

The glass transition temperature was measured by using one obtained by grinding glass cullet into a predetermined particle size, by means of a differential thermal analyzer (DTA) at a heating rate of 10° C./min in a nitrogen atmosphere. The temperature at the shoulder of a first heat absorption portion in the obtained DTA curve was read as the glass transition temperature.

As a test for flame retardancy, in accordance with UL94 standard, using a test specimen having a width of 12.7 mm, a length of 127 mm and a thickness of 1.6 mm, vertical burning test was carried out five times with respect to a test specimen having the same composition. The afterflame times in the vertical burning test five times were summed up with respect to each test specimen and taken as the total afterflame time (sec), and when it exceeded 250 seconds, measurement was impossible. In accordance with the evaluation standards in the above standard, the test specimen was classified into burning quality classes V-0, V-1 and V-2. A case where the total afterflame time is at most 50 seconds and there is no igniting of cotton wool due to flaming particles or drops, is classified into V-0, a case where the total afterflame time exceeds 50 seconds and at most 250 seconds, and there is no igniting of cotton wool due to flaming particles or drops is classified into V-1, and a case where the total afterflame time exceeds 50 seconds and at most 250 seconds, and there is igniting of cotton wool due to flaming particles or drops is classified into V-2. A case which does not fall under any of V-0, V-1 and V-2 is classified into V-OUT.

A test for smoke generation suppressing property was carried out in accordance with a test method of ASTM-E662, using a test specimen having a width of 76.2 mm, a length of 76.2 mm and a thickness of 3 mm by means of NBS smoke chamber tester. In the test, attenuation of a transmitted light by smoke generated in a test chamber when the test specimen was heated by applying radiant energy of 25 KW/m$^2$ on the average under nonflaming condition was measured. The amount of smoke generated was obtained as the maximum specific optical density (Dmax) to evaluate the smoke generation suppressing property.

A test for deflection temperature under load (hereinafter referred to as DTUL) as an index of the heat resistance strength was carried out in accordance with ASTM-D648 using a test specimen having a thickness of 3.2 mm, a with of 12.7 mm and a length of 127 mm. Further, a test for flexural strength was carried out in accordance with ASTM-D790, and a test for Izod impact strength was carried out in accordance with ASTM-D256 using a notched test specimen having a thickness of ⅛ inch.

(Preparation of Glass Cullet)

Glass cullet (A1) was prepared by mixing and melting and then solidifying glass-forming materials so as to achieve a glass composition, as a first glass composition as represented by mol percentage, of 4.1% of $Li_2O$, 5.7% of $Na_2O$, 4.4% of $K_2O$, 24.9% of $P_2O_5$, 9.3% of $SO_3$, 40.5% of ZnO, 1.5% of $Al_2O_3$ and 9.6% of $B_2O_3$. The glass transition temperature of the cullet A1 was measured and found to be 354° C.

Further, glass cullet (A2) was prepared by mixing and melting and then solidifying glass-forming materials so as to achieve a glass composition, as a second glass composition as represented by mol percentage, of 9.0% of $Li_2O$, 10.6% of $Na_2O$, 7.4% of $K_2O$, 24.8% of $P_2O_5$, 14.6% of $SO_3$ and 33.6% of ZnO. The glass transition temperature of the cullet A2 was measured and found to be 240° C.

The cullet A1 was ground to obtain three types of glass powders having average particle sizes (volume basis, D50, target values) of 3.5 μm, 7.0 μm and 20.0 μm Further, the glass powder having an average particle size of 3.5 μm was classified to obtain glass powders having average particle sizes of 1.0 μm and 0.7 μm. Further, the cullet A2 was ground to obtain glass powders having average particle sizes (volume basis, D50, target values) of 3.5 μm, 2.5 μm and 7.0 μm. The glass powder having an average particle size of 3.5 μm prepared from the glass cullet A1 corresponds to Example 1, the glass powder having an average particle size of 7.0 μm Comparative Example 1, the glass powder having an average particle size of 20.0 μm Comparative Example 2, the glass powder having an average particle size of 1.0 μm Example 2, and the glass powder having an average particle size of 0.7 μm Example 3. Further, the glass powder having an average particle size of 3.5 μm prepared from the glass cullet A2 corresponds to Example 4, the glass powder having an average particle size of 2.5 μm Example 5, and the glass powder having an average particle size of 7.0 μm Comparative Example 3. The average particle size, the particle size distribution and the specific surface area of each of the eight types of glass powders in Examples 1 to 5 and Comparative Examples 1 to 3 were measured and the results are summarized in Table 1.

TABLE 1

|  |  | Ex. 1 | Comp. Ex. 1 | Comp. Ex. 2 | Ex. 2 | Ex. 3 | Ex. 4 | Ex. 5 | Comp. Ex. 3 |
| --- | --- | --- | --- | --- | --- | --- | --- | --- | --- |
| Cullet |  | A1 | A1 | A1 | A1 | A1 | A2 | A2 | A2 |
| Average particle size (target value) |  | 3.5 μm | 7.0 μm | 20.0 μm | 1.0 μm | 0.7 μm | 3.5 μm | 2.5 μm | 7.0 μm |
| Measurement results Average particle size |  |  |  |  |  |  |  |  |  |
| D10 | μm | 1.2 | 1.9 | 3.4 | 0.5 | 0.4 | 1.2 | 1.3 | 1.6 |
| D50 | μm | 3.5 | 7.1 | 19.2 | 1.2 | 0.7 | 3.4 | 2.6 | 7.0 |
| D90 | μm | 8.1 | 23.9 | 64.9 | 1.9 | 1.0 | 7.9 | 4.8 | 22.4 |

TABLE 1-continued

|  |  | Ex. 1 | Comp. Ex. 1 | Comp. Ex. 2 | Ex. 2 | Ex. 3 | Ex. 4 | Ex. 5 | Comp. Ex. 3 |
|---|---|---|---|---|---|---|---|---|---|
| Specific surface area | m$^2$/cm$^3$ | 3.0 | 1.4 | 0.7 | 7.6 | 8.7 | 3.1 | 3.4 | 1.4 |
| Particle size distribution |  | 2.0 | 3.1 | 3.2 | 1.2 | 0.9 | 2.0 | 1.3 | 3.0 |

To each of the glass powders of Examples 1, 2, 4 and 5 and Comparative Examples 1, 2 and 3, a treating agent containing a monoaminosilane coupling agent was applied in an amount of 1.2 mass % as a solid content on the basis of the mass of the glass powder after the application and dried to obtain each of glass powders subjected to a surface treatment corresponding to Examples 6 to 9 and Comparative Examples 4 to 6.

To each of the glass powders of Example 1 and Comparative Example 2, a treating agent containing 50 mass % of a monoaminosilane coupling agent and 50 mass % of a urethane resin was applied in an amount of 1.2 mass % as a solid content on the basis of the mass of the glass powder after application and dried to obtain each of glass powders subjected to a surface treatment corresponding to Example 10 and Comparative Example 7.

To the glass powder of Example 1, a treating agent containing 50 mass % of a monoaminosilane coupling agent and 50 mass % of an epoxy resin was applied in an amount of 1.2 mass % as a solid content on the basis of the mass of the glass powder after application and dried to obtain a glass powder subjected to a surface treatment corresponding to Example 11.

With respect to each of the obtained glass powders of Examples 6 to 11 and Comparative Examples 4 to 7, the glass powder used, the average particle size (volume basis, D50, measured value unless otherwise specified) and the treating agent are shown in Table 2.

parts by mass of the glass powder of Example 1, 3 parts by mass of dibutyltin mercaptide (ADK STAB 1291, manufactured by ASAHI DENKA CO., LTD) as a stabilizer and 1 part by mass of calcium stearate (GF-200, manufactured by NOF CORPORATION) as a slip additive were put in a twin kneading roller apparatus at a number of revolution of the roll of 20 rpm at a preset temperature of 180° C. and melt-kneaded for 8 minutes to obtain a resin composition. The resin composition was molded by using a flat pressing machine at a die temperature of 180° C. under a molding pressure of 10 MPa for a molding time of 5 minutes to obtain a molded product of the vinyl chloride resin composition of Example 12.

COMPARATIVE EXAMPLE 8

A molded product of the vinyl chloride resin composition of Comparative Example 8 was obtained in the same manner as in Example 12 except that the glass powder of Comparative Example 1 was used.

COMPARATIVE EXAMPLE 9

A molded product of the vinyl chloride resin composition of Comparative Example 9 was obtained in the same manner as in Example 12 except that the glass powder of Comparative Example 2 was used.

TABLE 2

|  | Ex. 6 | Ex. 7 | Ex. 8 | Ex. 9 | Comp. Ex. 4 | Comp. Ex. 5 | Comp. Ex. 6 | Ex. 10 | Comp. Ex. 7 | Ex. 11 |
|---|---|---|---|---|---|---|---|---|---|---|
| Treating agent | Mono-amino-silane | Mono-amino-silane | Mono-amino-silane | Mono-amino-silane | Mono-amino-silane | Mono-amino-silane | Mono-amino-silane | Mono-amino-silane + urethane resin | Mono-amino-silane + urethane resin | Mono-amino-silane + epoxy resin |
| Glass cullet | A1 | A1 | A2 | A2 | A1 | A1 | A2 | A1 | A1 | A1 |
| Average particle size (μm) | 1.2 | 3.5 | 3.4 | 2.6 | 7.1 | 19.2 | 7.0 | 3.5 | 19.2 | 3.5 |
| Glass powder used | Ex. 2 | Ex. 1 | Ex. 4 | Ex. 5 | Comp. Ex. 1 | Comp. Ex. 2 | Comp. Ex. 3 | Ex. 1 | Comp. Ex. 2 | Ex. 1 |

(Preparation of Vinyl Chloride Resin Composition)

EXAMPLE 12

100 parts by mass of a polyvinyl chloride resin (PVC: TK800, manufactured by Shin-Etsu Polymer Co., Ltd.), 50

A test specimen to be used for the test of smoke generation suppressing property and the test for the Izod impact strength were obtained from the molded products of Example 12 and Comparative Examples 8 and 9, and the above tests were carried out. The evaluation results are shown in Table 3.

TABLE 3

|  |  | Ex. 12 Ex. 1 | Comp. Ex. 8 Comp. Ex. 1 | Comp. Ex. 9 Comp. Ex. 2 |
|---|---|---|---|---|
| Glass powder | Glass cullet | A1 | A1 | A1 |
|  | Average particle size (μm) | 3.5 | 7.1 | 19.2 |
|  | Treating agent | Nil | Nil | Nil |
| Smoke generation suppressing property | Dmax | 110 | 165 | 250 |
| Izod impact strength | KJ/m$^2$ | 3.3 | 2.8 | 2.4 |

The resin composition of Example 12 using the glass powder having an average particle size of 3.5 μm has a small amount of smoke generation and has high impact strength as compared with the resin compositions of Comparative Examples 8 and 9 using the glass powders 15 having average particle sizes of 7.1 μm and 19.2 μm, respectively.

(Preparation of Polycarbonate Resin Composition)

EXAMPLE 13

100 parts by mass of a polycarbonate resin (PC: LEXAN 121R, manufactured by GE Plastics Japan Ltd.), 5 parts by mass of the glass powder of Example 1 and 0.2 part by mass of PTFE (average particle size: 475 μm, manufactured by Asahi Glass Company, Limited) as an anti-dripping agent were preliminarily mixed and then melt-kneaded by using a twin-screw extruder at a preset temperature of a cylinder of 260° C. to obtain a thermoplastic resin composition in the form of pellets. The obtained pellets were dried at 120° C. for 5 hours and then molded by using an injection molding machine at a cylinder temperature of 290° C. at a die temperature of 105° C. to obtain a test specimen of Example 13.

EXAMPLES 14 TO 19

Test specimens of molded products of polycarbonate resin compositions of Examples 14 to 19 were obtained in the same manner as in Examples 13 except that the glass powders as shown in Table 4 were used.

COMPARATIVE EXAMPLES 10 TO 12

Test specimens of molded products of polycarbonate resin compositions of Comparative Examples 10 to 12 were obtained in the same manner as in Example 13 except that the glass powders as shown in Table 4 were used.

Using the test specimens of Examples 13 to 19 and Comparative Examples 10 to 12, the test for flame retardancy, the test for deflection temperature under load (hereinafter referred to as DTUL), the test for flexural strength and the test for Izod impact strength were carried out. The evaluation results are summarized in Table 4.

TABLE 4

|  |  | Ex. 13 Ex. 1 | Ex. 14 Ex. 3 | Ex. 15 Ex. 6 | Ex. 16 Ex. 7 | Ex. 17 Ex. 10 | Ex. 18 Ex. 11 | Comp. Ex. 10 Comp. Ex. 4 | Comp. Ex. 11 Comp. Ex. 5 | Comp. Ex. 12 Comp. Ex. 7 | Ex. 19 Ex. 8 |
|---|---|---|---|---|---|---|---|---|---|---|---|
| Glass powder | Glass cullet | A1 | A1 | A1 | A1 | A1 | A1 | A1 | A1 | A1 | A2 |
|  | Average particle size (μm) | 3.5 | 0.7 | 1.2 | 3.5 | 3.5 | 3.5 | 7.1 | 19.2 | 19.2 | 3.4 |
|  | Treating agent | Nil | Nil | Mono-amino-silane | Mono-amino-silane | Mono-amino-silane + urethane resin | Mono-amino-silane + epoxy resin | Mono-amino-silane | Mono-amino-silane | Mono-amino-silane + urethane resin | Mono-amino-silane |
| UL94 | Total afterflame time (sec) | 38 | 32 | 34 | 26 | 30 | 28 | 46 | — | 71 | 32 |
|  | Judgment | V-0 | V-0 | V-0 | V-0 | V-0 | V-0 | V-1 | V-OUT | V-1 | V-0 |
| DTUL | ° C. | 124 | 126 | 125 | 125 | 125 | 125 | 124 | 124 | 124 | 125 |
| Izod impact strength | KJ/m$^2$ | 6.9 | 8.6 | 8.2 | 7.7 | 8.5 | 8.3 | 6.8 | 6.6 | 7.0 | 7.5 |
| Flexural strength | MPa | 103 | 104 | 106 | 104 | 107 | 106 | 102 | 100 | 102 | 104 |

The flame retardancy of the resin compositions of Examples 13 to 18 using the glass powders having an average particle size of 0.7 μm, 1.2 μm or 3.5 μm was rated V-0, and the flame retardancy of the resin compositions of Comparative Examples 10 to 12 using the glass powders having an average particle size of 7.1 μm or 19.2 μm was rated V-1 or V-OUT. The flame retardancy improved when the glass powder of the present invention having an average particle size of at least 0.5 μm and smaller then 5.0 μm and having a specific surface area of at least 1.5 m²/cm³ was used.

The resin compositions of Examples 16 to 18 using the glass powders having a treating agent applied thereto have improved impact strength and flexural strength and have unimpaired flame retardancy, as compared with the resin composition of Example 13, by application of the treating agent to the glass powder. Further, the impact strength and the flexural strength further improved by use of the glass powder having a treating agent containing a urethane resin or an epoxy resin in addition to a monoaminosilane applied thereto.

When Comparative Examples 11 and 12 are compared, the resin composition using the glass powder having a treating agent containing a urethane resin in addition to a monoaminosilane applied thereto has improved impact strength but is insufficient in flame retardancy.

The flame retardancy of the resin compositions of Examples 16 and 19 using the glass powders having glass transition temperatures of 354° C. and 240° C., respectively, was rated V-0, and the effects of imparting flame retardancy in these Examples were equal to each other.

(Preparation of Polymer Alloy Composition Comprising Polyphenylene Ether Resin and Polypropylene Resin)

EXAMPLE 20

100 parts by mass of a polymer alloy (PPE/PP: Xyron T0700, manufactured by Asahi Kasei Corporation) comprising a polyphenylene ether resin and a polypropylene resin, 10 parts by mass of the glass powder of Example 9, 20 parts by mass of resorcinol bis(dixylenyl) phosphate (RDP, PX-200, manufactured by DAIHACHI CHEMICAL INDUSTRY CO., LTD) as a phosphorus flame retardant and 0.2 part by mass of PTFE (average particle size: 475 μm, manufactured by Asahi Glass Company, Limited) as an anti-dripping agent were preliminarily mixed, and melt-kneaded by using a twin-screw extruder at a preset temperature of a cylinder of 260° C. to obtain a polymer alloy composition in the form of pellets. This polymer alloy composition was dried at 100° C. for 3 hours and then molded by using an injection molding machine at a cylinder temperature of 270° C. at a die temperature of 60° C. to obtain a test specimen of Example 20.

COMPARATIVE EXAMPLE 13

A test specimen of a molded product of a polymer alloy composition of Comparative Example 13 was obtained in the same manner as in Example 20 except that the glass powder of Comparative Example 6 was used.

Using the test specimens of Example 20 and Comparative Example 13, the test for flame retardancy, the test for DTUL, the test for flexural strength and the test for Izod impact strength were carried out, and the evaluation results are shown in Table 5.

TABLE 5

|  |  | Ex. 20 Ex. 9 | Comp. Ex. 13 Comp. Ex. 6 |
|---|---|---|---|
| Glass powder | Glass cullet | A2 | A2 |
|  | Average particle size (μm) | 2.6 | 7.0 |
|  | Treating agent | Monoamino-silane | Monoamino-silane |
| UL94 | Total afterflame time (sec) | 42 | 75 |
|  | Judgment | V-1 | V-1 |
| DTUL | ° C. | 92 | 90 |
| Izod impact strength | KJ/m² | 3.5 | 3.4 |
| Flexural strength | MPa | 83 | 81 |

The flame retardancy of the resin composition of Example 20 using the glass powder having an average particle size of 2.6 μm and the flame retardancy of the resin composition of Comparative Example 13 using the glass powder having an average particle size of 7.0 μm were both rated V-1. However, the total afterflame time was shortened by use of the glass powder of the present invention having an average particle size of at least 0.5 μm and smaller than 5.0 μm and having a specific surface area of at least 1.5 m²/cm³.

The glass powder of the present invention is useful as a flame retardant to be blended with a thermoplastic resin or a thermosetting resin. The resin composition of the present invention is useful as a molding material to obtain various molded products. The resin composition of the present invention as a molded product can be used for materials for electronic and electrical field, materials for vehicles, etc., and can be used for materials for the roof, materials for the opening, other building materials, etc.

The entire disclosures of Japanese Patent Application No. 2004-218951 filed on Jul. 27, 2004 and Japanese Patent Application No. 2005-165769 filed on Jun. 6, 2005 including specifications, claims and summaries are incorporated herein by reference in their entireties.

What is claimed is:

1. A glass powder having an average particle size of at least 0.5 μm and smaller than 5.0 μm, and having a specific surface area of at least 1.5 m²/cm³, which glass powder substantially has the following composition as represented by mol % based on oxides, and has a glass transition temperature higher than 300° C. and lower than 400° C.:

$P_2O_5$: 22 to 27%, $SO_3$: 3 to 18%, ZnO: 10 to 55%, $Al_2O_3$: 1 to 5%, $B_2O_3$: 5 to 15%, $Li_2O+Na_2O+K_2O$: 5 to 35% (provided that $Li_2O$: 0 to 15%, $Na_2O$: 3 to 15%, $K_2O$: 0 to 10%), MgO: 0 to 15%, CaO: 0 to 15%, BaO: 0 to 15% and SnO: 0 to 15%.

2. The glass powder according to claim 1, which has a particle size distribution represented by the following formula of at most 2.5:

particle size distribution=$(D90-D10)/D50$ wherein D10, D50 and D90 represent, in a cumulative particle size curve prepared by measuring the particle size by using a laser scattering type particle size measuring apparatus, particle sizes of particles corresponding to spheres when accumulated amounts are 10%, 50% and 90%, respectively.

3. The glass powder according to claim 1, which is subjected to a surface treatment with a treating agent containing at least a coupling agent.

4. The glass powder according to claim 3, wherein the coupling agent is a silane coupling agent.

5. The glass powder according to claim 3, wherein the treating agent is a treating agent comprising a urethane resin.

6. A resin composition comprising 100 parts by mass of a resin and from 0.5 to 100 parts by mass of the glass powder as defined in claim 1.

7. The glass powder according to claim 1, wherein the average particle size is at least 1.0 μm and smaller than 3.0 μm.

8. The glass powder according to claim 1, wherein the specific surface area is at least 1.8 $m^2/cm^3$.

9. A process for producing the glass powder according to claim 1, comprising mixing glass-forming materials to achieve a glass composition, melting the materials and then solidifying the materials to prepare glass cullet, and grinding the glass cullet.

10. The resin composition according to claim 6, wherein the resin is a chlorine-containing thermoplastic resin.

11. The resin composition according to claim 10, wherein the resin is at least one resin selected from the group consisting of a polyvinyl chloride, a chlorinated polyvinyl chloride, a chlorinated polyethylene, a polyepichlorohydrin and a polyvinylidene chloride.

12. The resin composition according to claim 11, wherein the resin comprises polyvinyl chloride.

13. The resin composition according to claim 6, wherein the resin is a thermoplastic resin, and which is at least one engineering plastic selected from the group consisting of a polycarbonate resin, a polystyrene resin, an acrylonitrile-butadiene-styrene copolymer resin, an aromatic polyester resin, a polyamide resin, a polyarylate resin, a polyphenylene sulfide resin, a polyphenylene ether resin, a polysulfone resin, a polyethersulfone resin, a polyether ether ketone resin and a polyetherimide resin.

14. The resin composition according to claim 13, wherein the resin comprises a polycarbonate resin.

15. The glass powder according to claim 3, wherein the treating agent is a treating agent comprising an epoxy resin.

16. A process for producing the resin composition according to claim 6, comprising melting and mixing the resin and glass powder.

17. A glass powder having an average particle size of at least 0.5 μm and smaller than 5.0 μm, and having a specific surface area of at least 1.5 $m^2/cm^3$, which glass powder substantially has the following composition as represented by mol % based on oxides, and has a glass transition temperature higher than 200° C. and lower than 300° C.:

$P_2O_5$: 22 to 27%, $SO_3$: 8 to 18%, ZnO: 25 to 40%, $Al_2O_3$: 0 to 2%, $B_2O_3$: 0 to 10%, $Li_2O+Na_2O+K_2O$: 25 to 35% (provided that $Li_2O$: 5 to 15%, $Na_2O$: 8 to 20%, $K_2O$: 5 to 10%), MgO: 0 to 15%, CaO: 0 to 15%, BaO: 0 to 15% and SnO: 0 to 15%.

18. The glass powder according to claim 17, which has a particle size distribution represented by the following formula of at most 2.5:

particle size distribution=$(D90-D10)/D50$ wherein D10, D50 and D90 represent, in a cumulative particle size curve prepared by measuring the particle size by using a laser scattering type particle size measuring apparatus, particle sizes of particles corresponding to spheres when accumulated amounts are 10%, 50% and 90%, respectively.

19. The glass powder according to claim 17, which is subjected to a surface treatment with a treating agent containing at least a coupling agent.

20. The glass powder according to claim 19, wherein the coupling agent is a silane coupling agent.

21. The glass powder according to claim 19, wherein the treating agent is a treating agent comprising a urethane resin.

22. A resin composition comprising 100 parts by mass of a resin and from 0.5 to 100 parts by mass of the glass powder as defined in claim 17.

23. The glass powder according to claim 17, wherein the average particle size is at least 1.0 μm and smaller than 3.0 μm.

24. The glass powder according to claim 17, wherein the specific surface area is at least 1.8 $m^2/cm^3$.

25. A process for producing the glass powder according to claim 17, comprising mixing glass-forming materials to achieve a glass composition, melting the materials and then solidifying the materials to prepare glass cullet, and grinding the glass cullet.

26. The resin composition according to claim 22, wherein the resin is a chlorine-containing thermoplastic resin.

27. The resin composition according to claim 26, wherein the resin is at least one resin selected from the group consisting of a polyvinyl chloride, a chlorinated polyvinyl chloride, a chlorinated polyethylene, a polyepichlorohydrin and a polyvinylidene chloride.

28. The resin composition according to claim 27, wherein the resin comprises polyvinyl chloride.

29. The resin composition according to claim 22, wherein the resin is a thermoplastic resin, and which is at least one engineering plastic selected from the group consisting of a polycarbonate resin, a polystyrene resin, an acrylonitrile-butadiene-styrene copolymer resin, an aromatic polyester resin, a polyamide resin, a polyarylate resin, a polyphenylene sulfide resin, a polyphenylene ether resin, a polysulfone resin, a polyethersulfone resin, a polyether ether ketone resin and a polyetherimide resin.

30. The resin composition according to claim 29, wherein the resin comprises a polycarbonate resin.

31. The glass powder according to claim 19, wherein the treating agent is a treating agent comprising an epoxy resin.

32. A process for producing the resin composition according to claim 22, comprising melting and mixing the resin and glass powder.

* * * * *